June 30, 1953  J. C. WHITESELL  2,643,755
TRANSFER DEVICE FOR TRAVELING CONVEYERS
Filed Dec. 28, 1950  3 Sheets-Sheet 1

INVENTOR.
John C. Whitesell
BY
Maurice A. Crews
ATTORNEY

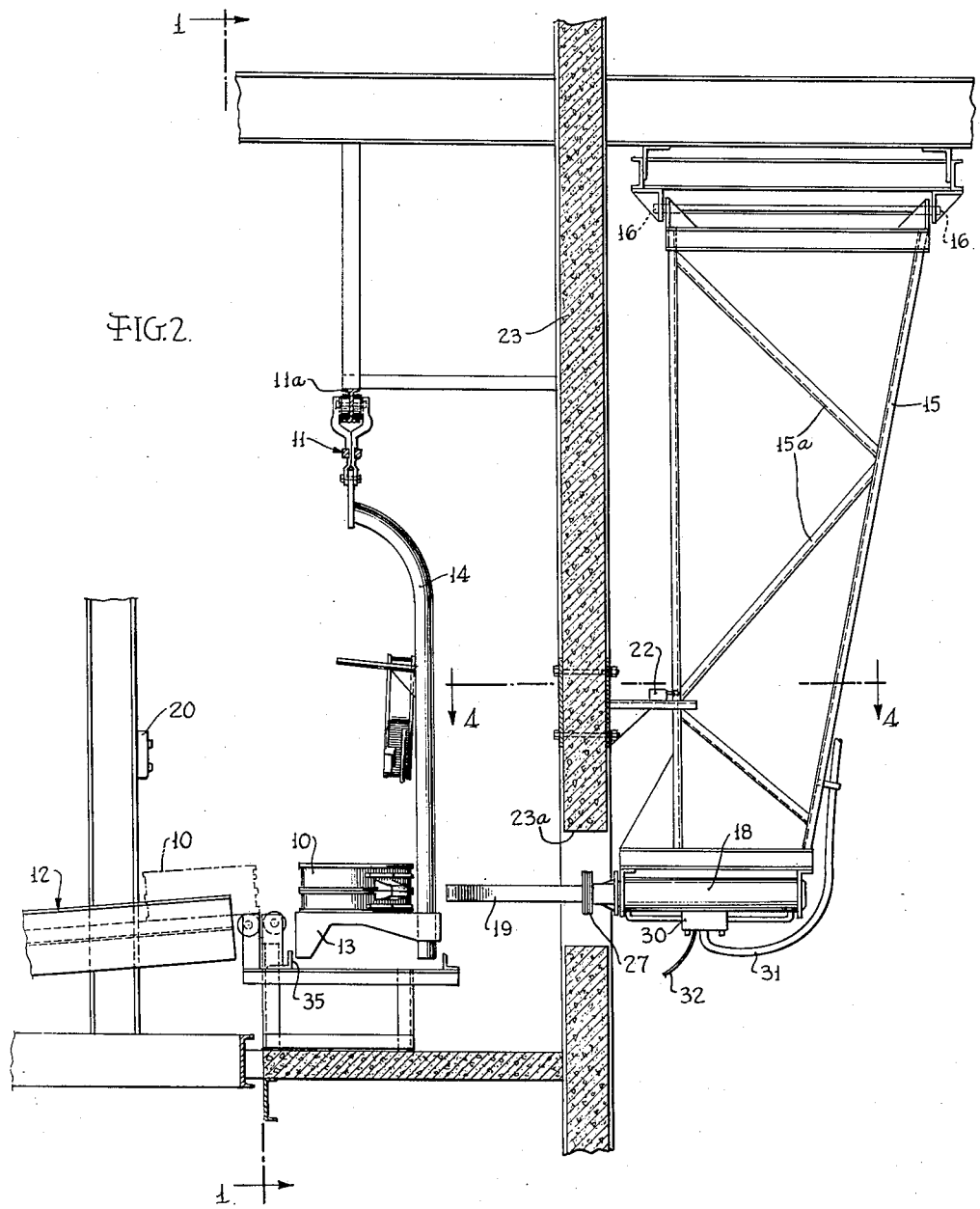

June 30, 1953     J. C. WHITESELL     2,643,755
TRANSFER DEVICE FOR TRAVELING CONVEYERS
Filed Dec. 28, 1950     3 Sheets-Sheet 3
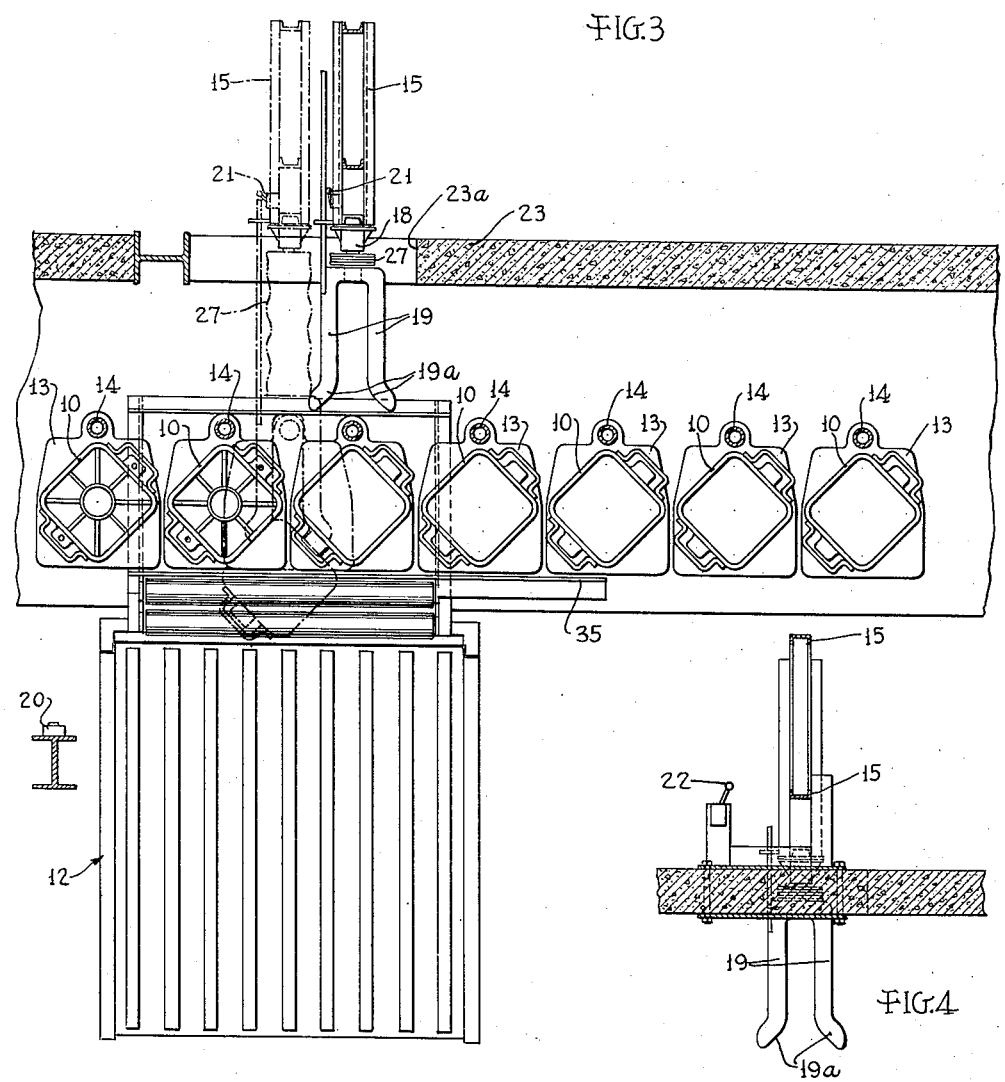
INVENTOR.
John C. Whitesell
BY 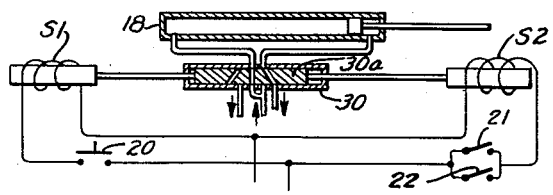
ATTORNEY

Patented June 30, 1953

2,643,755

UNITED STATES PATENT OFFICE 2,643,755

TRANSFER DEVICE FOR TRAVELING CONVEYERS

John C. Whitesell, Narberth, Pa., assignor to The Budd Company, Philadelphia, Pa., a corporation of Pennsylvania Application December 28, 1950, Serial No. 203,082

5 Claims. (Cl. 198—24)

This invention relates to a transfer device for a travelling conveyor and has for an object the provision of improvements in this art.

One of the particular objects is to provide a transfer device which will accurately and quickly move an article relative to a travelling conveyor. The device shown herein is used to push articles such as molds off a conveyor and the description will be directed especially to this employment but it will be understood that the device could be used as well to move other articles either off or onto a conveyor.

Another object is to provide a transfer device which is of simple and sturdy construction and easy to mount.

Another object is to provide a transfer device which includes means for engaging a part on the conveyor to cause it to move positively with the conveyor if necessary.

Another object is to provide means for insuring the quick and timely return of the power element of a transfer device after it has moved an article relative to the conveyor.

The above and other objects and advantages of the invention will be apparent from the following description of an illustrative embodiment, reference being made to the accompanying drawings, wherein:

Fig. 2 is a vertical elevation and section looking to the left from the right side of Fig. 1;

Fig. 3 is a horizontal section taken on the line 3—3 of Fig. 1;

Fig. 4 is a partial horizontal section taken on the line 4—4 of Fig. 2; and

Fig. 5 is a schematic diagram showing the controls.

Figure 1:
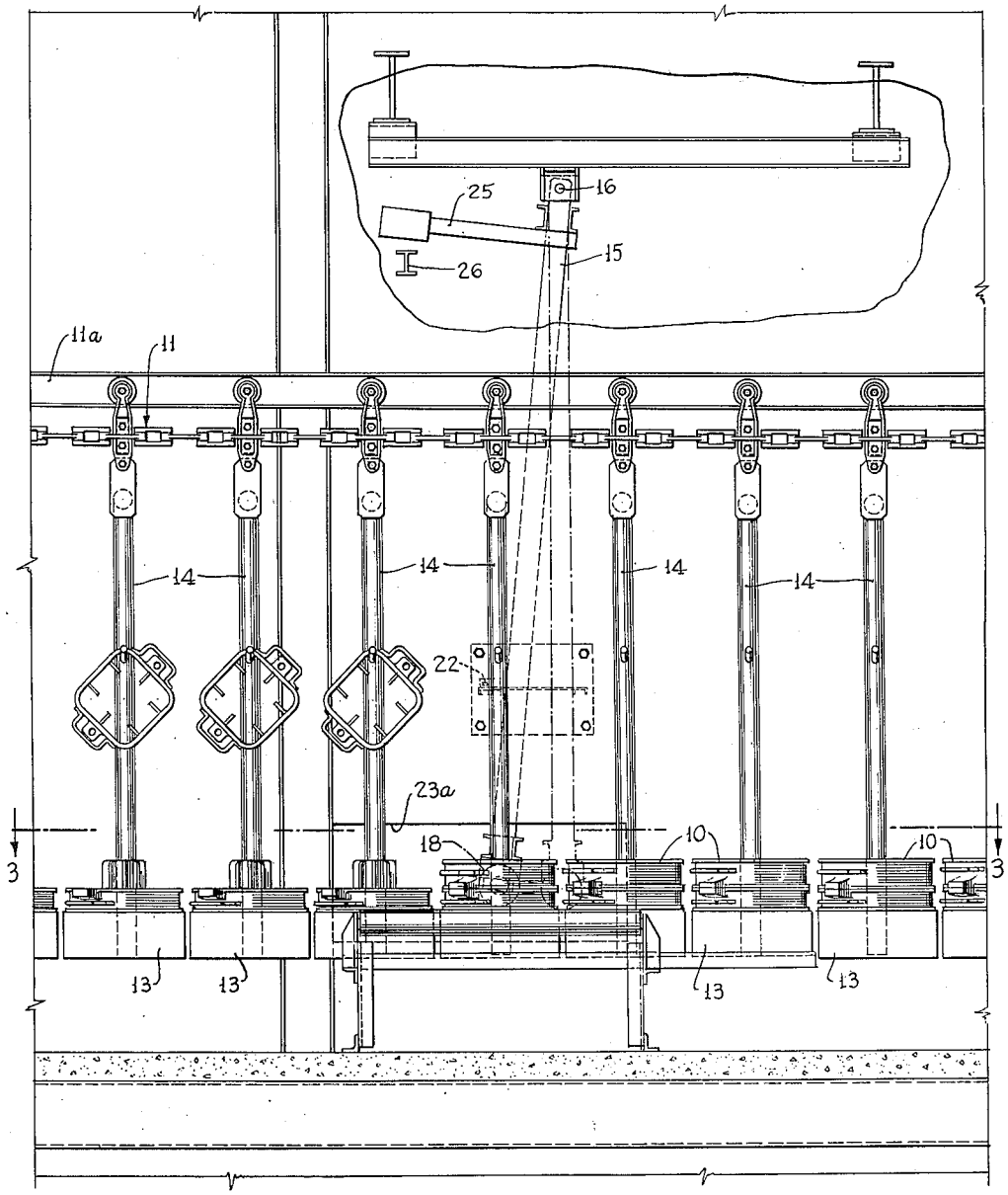
Fig. 1 is an end elevation of the device, the view being taken parallel to the line of movement of the conveyor on the line 1—1 of Fig. 2.

The articles 10 to be transferred, in the selected embodiment, are foundry molds which are disposed on a conveyor 11, the molds here being pushed out toward a shaker 12 which separates the articles from the sand removes both articles and sand from the molds.

The mold supports or tables 13 of the conveyor are carried by depending posts or bars 14 from an overhead conveyor trackway 11a. The tables 13 and molds 10 are located in front of the posts 14.

The transfer device includes a pendulum frame or support 15 mounted on overhead pins 16 carried by the ceiling or other suitable anchorage. The frame is made rigid in the plane of the pivot axis, as by diagonal braces 15a, to resist the thrust in pushing articles off the conveyor. At its lower end the frame carries a pushing device, here a fluid actuated cylinder-piston device 18 which is aligned with the plane of the frame.

The ram 19, or pusher proper, which is operated by the piston rod of the power device 18, is made as a divided or bifurcated part which is adapted to straddle a post 14 and engage an article 10 behind it. The ends 19a of the pusher are turned outward to facilitate movement past the post and to embrace a corner of the article, the article here being rectangular and placed on the conveyor at an angle to the line of movement of the conveyor. The push-out device or ram 19 is caused to move out and engage the article when the post is directly in front of the push-out ram, the frame hanging about in a vertical position at this time. The push-out action may be initiated manually by an operator through push buttom switch controls 20 or it may be initiated by a contact device, electric eye or the like in a manner known in the art.

The engagement of the ram with the article normally causes the transfer frame to swing and the ram to move along with the article on the conveyor. However, if the article should slide upon the conveyor table in the direction of the line of movement of the conveyor, due to lightness of the article or other cause, the engagement of the bifurcated ram with the conveyor post will positively move the ram along with the conveyor as the article is being pushed off.

After the article has been pushed off the conveyor the ram is automatically retracted to a position where it will clear the conveyor. This return of the ram may be caused by the natural timing of the operation of the power (cylinder-piston) device or by the actuation of a switch 21 by the ram at the outer end of its stroke. The engagement of the frame with a switch 22 in a predetermined limiting position in its path of movement causes the return of the piston and ram if the switch 21 has not yet been operated to cause their return and thereby prevents the frame from travelling so far as to cause damage. In the particular arrangement illustrated the push-out device moves in a hole 23a in a building wall 23 and the switch 22 causes the ram 19 to disengage the post 14 before the push-out device engages the side of the hole in the building wall. Here, again, an electric eye could be substituted for a physical contact device. It is preferred that the operator will not be depended upon to initiate the return of the ram, except in an emergency, because the automatic return is normally more dependable in its action than an operator and if the ram is not returned in time there will be damage to the apparatus. It is acceptable to depend on the operator for initiating the push-out action of the ram because he can judge accurately when the parts are in proper position and there may be many positions on the conveyor which do not carry an article to be pushed off. There is no damage done if the ram is not actuated, even if an article is not pushed off the conveyor when it should be, because it can be removed by another operator by hand or can be pushed off on the next trip around.

Means are provided for quickly returning the frame to its rest position, the means here shown comprising a weighted arm 25 and a stop 26 for halting the frame in proper position.

That portion of the piston rod 24 which carries the ram and which moves in and out of the cylinder may be encased in a bellows-like foldable covering 27 which prevents the piston rod from catching grit and dirt to wear its packing and guides in the end of the piston.

The control system, which is shown in Fig. 5, is so simple as to require no detailed description but mention may be made of the valve control means 30, air supply hose 31 and electrical cable 32 which are shown in Fig. 2. It may be noted in connection with Fig. 5 that when the push button 29 is closed the solenoid S1 at one end of the valve body 30a is energized to move the valve body in one direction; and when either the switch 21 or the switch 22 is closed the solenoid S2 at the other end is energized to move the valve body in the other direction. The valve body remains in either end position until moved in the other direction by a solenoid.

A guide rail 35 is shown for preventing the tables 13 from swinging out too far when the molds 10 are being pushed off to the side.

It is thus seen that the invention provides a simple, sturdy, accessible and dependable device for transferring articles relative to a conveyor in motion. While one embodiment of the invention has been illustrated and described by way of example, it will be understood that there may be various embodiments within the limits of the invention.

What is claimed is:

1. Apparatus for transferring articles relative to a travelling conveyor, comprising in combination, a swinging frame hinged on an axis disposed transversely to the line of movement of articles on the conveyor and at a distance from the path of movement of the articles, and a power device on the end of the frame opposite the hinged end and alongside the path of movement of the articles on the conveyor for shifting an article relative to the conveyor, the power device including a part having movement along a line parallel to the hinge axis of the swinging frame and across the path of movement of the articles on the conveyor.

2. Apparatus for transferring articles relative to a travelling conveyor, comprising in combination, a swinging frame hinged at the top on an axis disposed transversely to the line of movement of articles on the conveyor and at a distance from the path of movement of the articles, a power device mounted on the bottom end of the frame and alongside the path of movement of the articles for shifting an article as it travels with the conveyor, the power device including a part having movement along a line parallel to the hinge axis and across the path of movement of the articles on the conveyor, and means, including a part disposed in the path of movement of a part on the swinging frame, for automatically causing said power device to move back from the conveyor after a predetermined amount of travel with it.

3. Apparatus for transferring articles relative to a travelling conveyor, comprising in combination, a swinging frame hinged at the top on an axis disposed transversely to the line of movement of articles on the conveyor and at a distance from the path of movement of the articles, a power device mounted on the bottom end of the frame and alongside the path of movement of the articles for shifting an article as it travels with the conveyor, the power device including a part having movement along a line parallel to the hinge axis and across the path of movement of the articles on the conveyor, and means, including a part disposed in the path of movement of a part on the swinging frame, for automatically causing said power device to move back from the conveyor after a predetermined amount of travel with it, said means for causing withdrawal of the power device including an electrical control circuit having a switch actuated by a part on the swinging frame.

4. Apparatus for transferring articles relative to a travelling conveyor having upstanding members disposed at each article supporting position, comprising in combination, a swinging frame hinged on an axis disposed transversely to the line of movement of articles on the conveyor and at a distance from the path of movement of the articles, a power device mounted on the end of the frame opposite the hinged end and alongside the path of movement of the articles on the conveyor for shifting an article relative to the conveyor, the power device including a part having movement along a line parallel to the hinge axis of the swinging frame and across the path of movement of the articles on the conveyor, said part of the power device for shifting the article relative to the conveyor being bifurcated to straddle one of said upstanding parts on the conveyor and to move along with it as an article is moved relative to the conveyor by the power device, and means, including a part disposed in the path of movement of a part on the swinging frame, for automatically causing said power device to move back from the conveyor after a predetermined amount of travel with it, said means for causing withdrawal of the power device including an electrical control circuit having a switch actuated by a part on the swinging frame.

5. Apparatus for transferring articles relative to a travelling conveyor having uprights at article positions, comprising in combination, a pendulum frame mounted on overhead supporting means on an axis transverse to the line of travel of the conveyor, a push-out power device including a push-off ram mounted on the frame at the level of the articles on the conveyor, said ram being bifurcated to straddle the upright and being spread at the outer end to engage the corner of an article and assist passage past said upright, means for initiating outward movement of the ram to move an article relative to the conveyor, means for causing withdrawal of the ram after an article has been pushed, means for causing return of the frame, and means for stopping the frame after its return movement in proper position to engage another article.

JOHN C. WHITESELL.

References Cited in the file of this patent

UNITED STATES PATENTS

| Number | Name | Date |
|---|---|---|
| 1,133,565 | Kankkonen | Mar. 30, 1915 |
| 1,436,455 | Mingle | Nov. 21, 1922 |
| 1,843,599 | First | Feb. 2, 1932 |